United States Patent [19]

Kouzato

[11] Patent Number: 4,686,538

[45] Date of Patent: Aug. 11, 1987

[54] TONE RECORDING METHOD

[75] Inventor: Yasuo Kouzato, Tokyo, Japan

[73] Assignee: Canon Kabushiki Kaisha, Tokyo, Japan

[21] Appl. No.: 790,209

[22] Filed: Oct. 22, 1985

[30] Foreign Application Priority Data

Oct. 31, 1984 [JP] Japan .................................. 59-229779
Oct. 31, 1984 [JP] Japan .................................. 59-229780

[51] Int. Cl.$^4$ ......................... G01D 15/18; H04N 1/46
[52] U.S. Cl. ................................ 346/1.1; 346/140 R; 358/75; 358/298
[58] Field of Search ......................... 346/1.1, 140, 75; 358/75, 78, 298, 296

[56] References Cited

U.S. PATENT DOCUMENTS

| | | |
|---|---|---|
| Re. 27,555 | 1/1973 | Loughren . |
| 1,656,338 | 1/1928 | Ranger . |
| 1,790,723 | 2/1931 | Ranger . |
| 1,817,098 | 8/1931 | Ranger et al. . |
| 3,197,558 | 7/1965 | Ernst . |
| 3,404,221 | 10/1968 | Loughren . |
| 3,681,650 | 8/1972 | Koll .................................... 315/30 |
| 3,739,084 | 6/1973 | Heinrich ............................. 178/6 |
| 3,961,306 | 6/1976 | Anstey .............................. 340/15.5 |
| 4,108,654 | 8/1978 | Goren ................................. 96/1.2 |
| 4,178,597 | 12/1979 | Isayama et al. ..................... 346/75 |
| 4,272,771 | 6/1981 | Furukwa . |
| 4,300,142 | 11/1981 | Kos . |
| 4,313,684 | 2/1982 | Tazaki et al. . |
| 4,314,274 | 2/1982 | Atoji et al. . |
| 4,339,774 | 7/1982 | Temple . |
| 4,342,051 | 7/1982 | Suzuki et al. . |
| 4,365,275 | 12/1982 | Berman et al. . |
| 4,368,491 | 1/1983 | Saito . |
| 4,386,272 | 5/1983 | Check, Jr. et al. . |
| 4,394,662 | 7/1983 | Yoshida et al. . |
| 4,394,693 | 7/1983 | Shirley . |
| 4,403,874 | 9/1983 | Payne et al. . |
| 4,412,225 | 10/1983 | Yoshida ............................. 346/1.1 |
| 4,412,226 | 10/1983 | Yoshida . |
| 4,414,635 | 11/1983 | Gast et al. . |
| 4,431,319 | 2/1984 | Karaki et al. . |
| 4,438,453 | 3/1984 | Alston . |
| 4,468,706 | 8/1984 | Cahill . |
| 4,488,245 | 12/1984 | Dalke et al. . |
| 4,492,965 | 1/1985 | Ohnishi et al. . |
| 4,533,920 | 8/1985 | Suzuki et al. . |
| 4,533,928 | 8/1985 | Sugiura et al. . |
| 4,547,812 | 10/1985 | Waller et al. . |
| 4,549,222 | 10/1985 | Fogaroli et al. . |
| 4,559,542 | 12/1985 | Mita . |
| 4,560,997 | 12/1985 | Sato .................................... 346/140 |
| 4,595,984 | 6/1986 | Itoh ..................................... 358/75 |
| 4,604,654 | 8/1986 | Sakurada et al. . |

FOREIGN PATENT DOCUMENTS

| | | |
|---|---|---|
| 52-11712 | 1/1977 | Japan . |
| 53-102034 | 9/1978 | Japan . |
| 156264 | 9/1982 | Japan . |
| 58-60878 | 1/1983 | Japan . |
| 58-212970 | 11/1983 | Japan . |
| 59-52658 | 3/1984 | Japan . |
| 59-41969 | 3/1984 | Japan . |

OTHER PUBLICATIONS

IBM Technical Disclosure Bulletin, "Digital Color Printer", D. W. Skinner, et al., vol. 21, No. 5, Oct. 1978, pp. 1828-1829.

Primary Examiner—Joseph W. Hartary
Attorney, Agent, or Firm—Fitzpatrick, Cella, Harper & Scinto

[57] ABSTRACT

In a tone recording method, ink dots having at least two different concentrations per color are provided, and the number of dots, for each concentration, to be printed in a predetermined area is controlled in accordance with input density information. Overlap of the dots of different concentrations is also controlled in accordance with the input density information.

13 Claims, 9 Drawing Figures

| INPUT IMAGE DATA | DOT PATTERN | Y ADDRESS | X ADDRESS | MEMORY ADDRESS | DATA |
|---|---|---|---|---|---|
| 0 | 129-0 | 0 | 0 | 0 | 0 |
|   |       | 0 | 1 | 1 | 0 |
|   |       | 1 | 0 | 2 | 0 |
|   |       | 1 | 1 | 3 | 0 |
| 1 | 129-1 | 0 | 0 | 4 | 0 |
|   |       | 0 | 1 | 5 | 0 |
|   |       | 1 | 0 | 6 | 0 |
|   |       | 1 | 1 | 7 | 0 |
| 7 | 129-7 | 0 | 0 | 28 | 0 |
|   |       | 0 | 1 | 29 | 0 |
|   |       | 1 | 0 | 30 | 0 |
|   |       | 1 | 1 | 31 | 0 |
| 8 | 129-8 | 0 | 0 | 32 | 1 |
|   |       | 0 | 1 | 33 | 0 |
|   |       | 1 | 0 | 34 | 0 |
|   |       | 1 | 1 | 35 | 0 |
| 9 | 129-9 | 0 | 0 | 36 | 1 |
|   |       | 0 | 1 | 37 | 0 |
|   |       | 1 | 0 | 38 | 0 |
|   |       | 1 | 1 | 39 | 0 |
| 15 | 129-15 | 0 | 0 | 60 | 1 |
|    |        | 0 | 1 | 61 | 0 |
|    |        | 1 | 0 | 62 | 0 |
|    |        | 1 | 1 | 63 | 0 |
| 16 | 129-16 | 0 | 0 | 64 | 1 |
|    |        | 0 | 1 | 65 | 1 |
|    |        | 1 | 0 | 66 | 0 |
|    |        | 1 | 1 | 67 | 0 |

Fig. 8

TONE RECORDING METHOD

BACKGROUND OF THE INVENTION

1. Field of the Invention

The present invention relates to a tone recording method which uses at least two dot densities per color.

2. Description of the Prior Art

In a recording method of a tone image by binary recording, that is, by printing or not printing dots, a dither method and a density pattern method have been used. The number of dots to be printed in a unit matrix is controlled by input density data to express a tone. In this method, when a multi-tone image is to be reproduced, the size of the dot matrix must be increased and the resolution is lowered or a texture of a matrix pattern becomes an obstacle, and hence image quality is degraded.

In the past, it has been proposed to reproduce the tone by using at least two, i.e., high and low, dot densities per color. For example, the tone is reproduced by changing the number of high- and low-density dots in the dot matrix. Another tone recording method has also been proposed, in which the number of dots in the dots matrix and the diameter of the dot are changed. In those methods, however, since the minimum dot diameter which can be printed by an ink jet printer is restricted, the change of density in a highlight image area (low density area), particularly in an area from which recording of dots starts on a recording sheet, is large and hence the tone characteristic in that area is degraded. Even if the tonality of an original document smoothly changes, the data actually read includes a swing due to variations in input conditions including the signal from an input sensor. Accordingly, the dots are printed or not printed in the highlight area so that an uneven image is reproduced.

In the past, in order to improve the tone characteristic, particularly in the highlight area, it has been proposed to use inks having different concentrations of the same color. For example, when a high concentration ink and a low concentration ink are used, the low concentration ink should use a very low concentration dye in order to get a high tonality to the highlight area. As a result, a false outline appears at the junction of the high concentration ink and the low concentration ink due to differences between tonalities of the inks. This degrades the image quality. When high, medium and low concentration inks are used to print a low image density area by the low concentration ink, a medium image density area by the medium concentration ink and a high image density area by the high concentration ink, the tonality is improved because the number of tones is larger, but a false outline may still appear due to a difference of the hue. In order to prevent it, it is necessary to unify the hue over the areas of different densities.

It is desired to combine the high, medium and low density ink dots in order to increase the number of tones which can be reproduced. However, when many inks are printed at the same point, the record sheet cannot absorb the inks and the inks smear or the record sheet can become wavy. In an ink jet recorder, since a plurality of heads are spaced from each other, a distance from the head to the record sheet is not uniform and the tone recording is not precisely effected, and in the worst case, the head contacts to the record sheet and the record sheet may be torn.

SUMMARY OF THE INVENTION

It is an object of the present invention to provide a tone recording method which can eliminate the foregoing drawbacks in the prior art and reproduce a high tonality and high quality image.

It is another object of the present invention to provide a tone recording method which controls the number of high and low density dots as well as overlapping of the dots so that multi-tone recording is attained with a small dot matrix. More particularly, by changing overlapping of the dots without changing the number of dots, the record density is changed. In this manner, the multi-tone reproduction is attained.

It is still another object of the present invention to provide a tone recording method in which the number of ink dots of the same color printed at the same point is limited to up to two so that the above problem produced by the increase of the amount of ink is resolved.

It is still another object of the present invention to provide a tone recording method in which middle density dots are distributed over the entire area to prevent the appearance of the false outline due to the hue difference so that a high tonality and high quality print is reproduced.

Other objects of the present invention will be apparent from the following description of the present invention.

DESCRIPTION OF THE PREFERRED EMBODIMENTS

Figure 1:
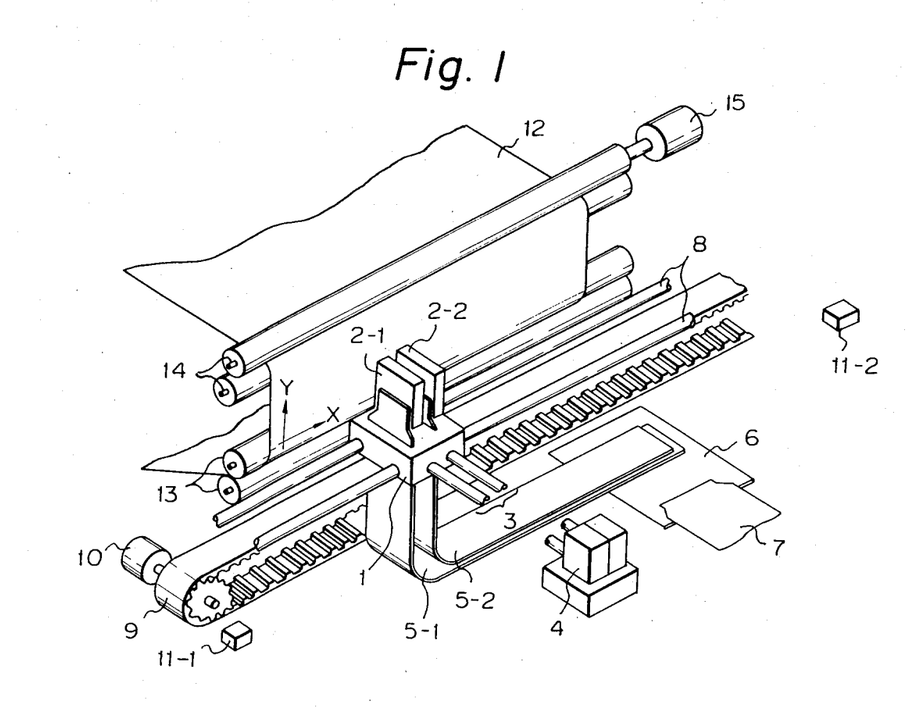
FIG. 1 is a perspective view of a first embodiment of an ink jet printer.

FIG. 1 shows an ink jet printer in accordance with the present invention. First and second multi-nozzle heads 2-1 and 2-2 are arranged from left to right on a carriage 1 to discharge high and low concentration inks therefrom. The multi-nozzle heads are supplied with the inks of the appropriate concentrations from ink tanks 4 through flexible supply pipes 3. Drive signals are supplied to the multi-nozzle heads through flexible insulation belts 5-1 and 5-2 having a number of conductive wires embedded therein, a relay terminal plate 6 and a power supply belt 7. A carriage 1 is mounted on two guide rails 8 and connected to an endless belt 9, which is driven by a pulse motor 10 to reciprocally move the carriage 1 in a direction X to effect a main scan. A record sheet 12 extending between roller pairs 13 and 14 is fed by a pulse motor 15 coupled to the roller pair 14 in a Y direction to effect a sub-scan. Thus, an image is printed on the record sheet 12 by the inks of different concentrations discharged from the multi-nozzle heads 2-1 and 2-2. Stoppers 11-1 and 11-2 are arranged at the opposite ends of the reciprocal path of the carriage 1 to restrict the range of the main scan.

Figure 2:
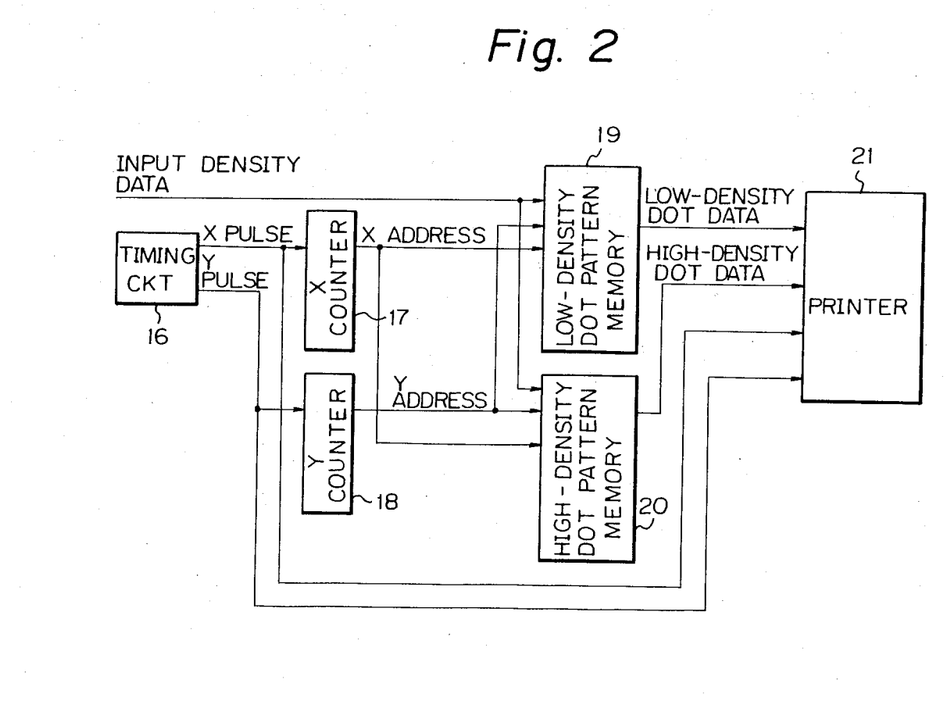
FIG. 2 is a block diagram of a dot pattern generator of FIG. 1 for generating a dot pattern.

FIG. 2 shows a dot pattern generator which generates an ON-OFF binary signal to be supplied to the head of the ink jet printer. A timing circuit 16 generates pulse signals called an X pulse which indicates a position of the head in the main scan direction (arrow X) and a Y pulse which indicates a position of the head in the sub-scan direction (arrow Y), which are supplied to an X counter 17 and a Y counter 18, respectively, as stepping pulses, and also sent to a printer 21 for use as a timing signal for printing. The X pulse and Y pulse are also supplied to an input device (not shown) for use as a timing signal in sending input density data to the dot pattern generator. The X counter 17 and the Y counter 18 generate an X address signal and a Y address signal, respectively, to select a cell in the dot matrix. When a 3×3 dot matrix is used, for example, the X counter 17 and the Y counter 18 may be scale-of-three counters. A low density dot pattern memory 19 and a high density dot pattern memory 20 receive the input density data and the address signals, X address and Y address and produce ON-OFF binary low density dot data and high density dot data, respectively. The data have been pre-written therein in accordance with predetermined data arrangements. The printer 21 may be as shown in FIG. 1, which controls the discharge of the inks from the ink jet heads 2-1 and 2-2, and the pulse motor 10 by the low density dot data, high density dot data, X pulse and Y pulse.

A reflection or optical density (OD) obtained when a high concentration ink dot and a low concentration ink dot are printed overlapping at the same position on a record sheet is not equal to that obtained when those dots are printed at different positions. The OD obtained in the latter case is larger. When the dots are printed overlapping, the amount of inks printed at the same position is larger and the dot area spreads. However, the spread is slight. Since a record sheet having a high absorption property is usually used for an ink jet printer, the dot does not spread much in spite of the increase of the amount of ink, and in the overlapped area of the high and low concentration inks, the dyes penetrate depthwise of the sheet. Accordingly, the OD value is smaller than the sum of the respective OD values of the high and low concentration dots. Accordingly, by utilizing this effect, many tones can be reproduced with a small dot matrix and a high resolution, and high tonality and high quality print are obtained.

The number of tone levels which can be reproduced by the present recording method is given by:

$$T = \frac{1}{(2^{l-1} - 1)!} \cdot \frac{(m \cdot n + 2^{l-1} - 1)!}{(m \cdot n)!}$$

where

T: number of tone levels reproduceable by the dot matrix m·n: size of the dot matrix l: number of multiplication (l=3 when two concentrations are used, and l=4 when three concentrations are used)

The numbers of tones reproduceable by various matrix size and number of multiplication are shown below.

| Matrix Size | l = 2 | l = 3 | l = 4 |
|---|---|---|---|
| 2 × 2 | 5 | 35 | 330 |
| 3 × 3 | 10 | 220 | 11440 |
| 4 × 4 | 17 | 969 | 245157 |

Figure 3:
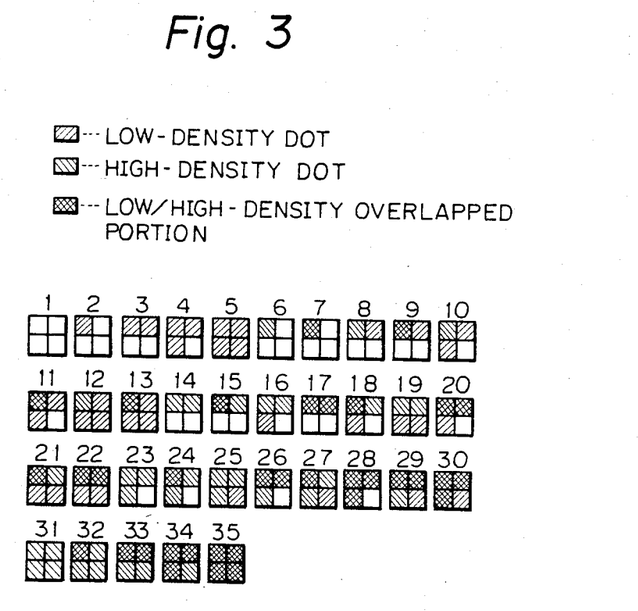
FIG. 3 shows an example of a dot matrix formed in the first embodiment.

FIG. 3 shows a dot print when the matrix size is 2×2 and l=3. Only five tones are reproduced by binary recording using one type of ink, but when high and low concentration inks are used and the overlap of the dots is changed, as much as 35 tones are reproduced by the 2×2 matrix. The number of tones reproduceable can be further increased by increasing the size of the dot matrix and the number of multiplication.

When the data are to be written into the dot pattern memories 19 and 20, gray scale patches are printed by the dot pattern shown in FIG. 3, the OD values of the patches are measured, the patches are rearranged in the ascending order of the OD values, the input data and the dot patterns are correlated to fit a visual sense of humans, that is, the OD values of the print have a linear relation to the input density data, and the data are written into the dot pattern memories.

In the above embodiment, the high and low density dots are used for one color. This can be expanded to a color application by using the high and low density dots for each of Y, M and C.

In the present embodiment, the ink jet printer was explained. The present invention is applicable to any type of printer such as a thermal transfer printer which forms an image by dots.

As explained hereinabove, by using at least two high and low density dots per color and controlling the number of dots in the dot matrix and the overlap of the dots, the multi-tone print is obtained without lowering the resolution.

A second embodiment of the present invention is now explained. In the present embodiment, an ink jet printer is used and a digital modulation method for controlling the number of ink dots to be printed in the dot matrix is explained.

Figure 4:
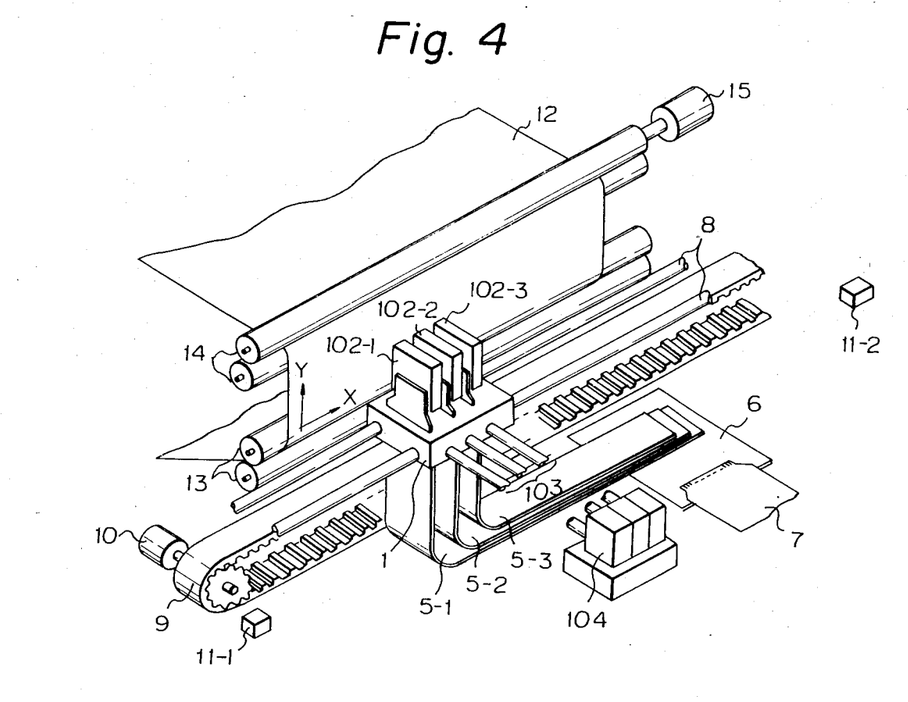
FIG. 4 is a perspective view of a second embodiment of an ink jet printer.

FIG. 4 shows the ink jet printer in accordance with the second embodiment. The like elements to those shown in the first embodiment of FIG. 1 are designated by the same numerals.

First to third multi-nozzle heads 102-1 to 102-3 are arranged from left to right on a carriage 1 to discharge high, medium and low concentration inks therefrom. Those multi-nozzle heads are supplied with inks of the corresponding concentrations from ink tanks 104 through flexible pipes 103.

Figure 5A:
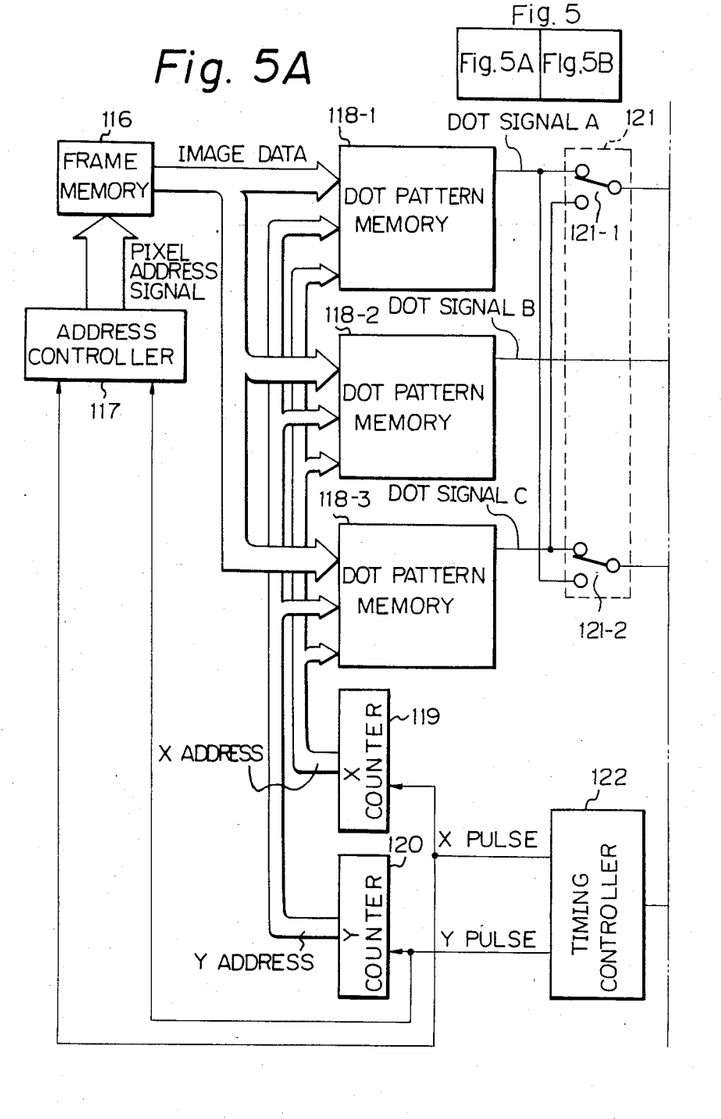
FIGS. 5A and B are a block diagram of the ink jet printer.
Figure 5B:
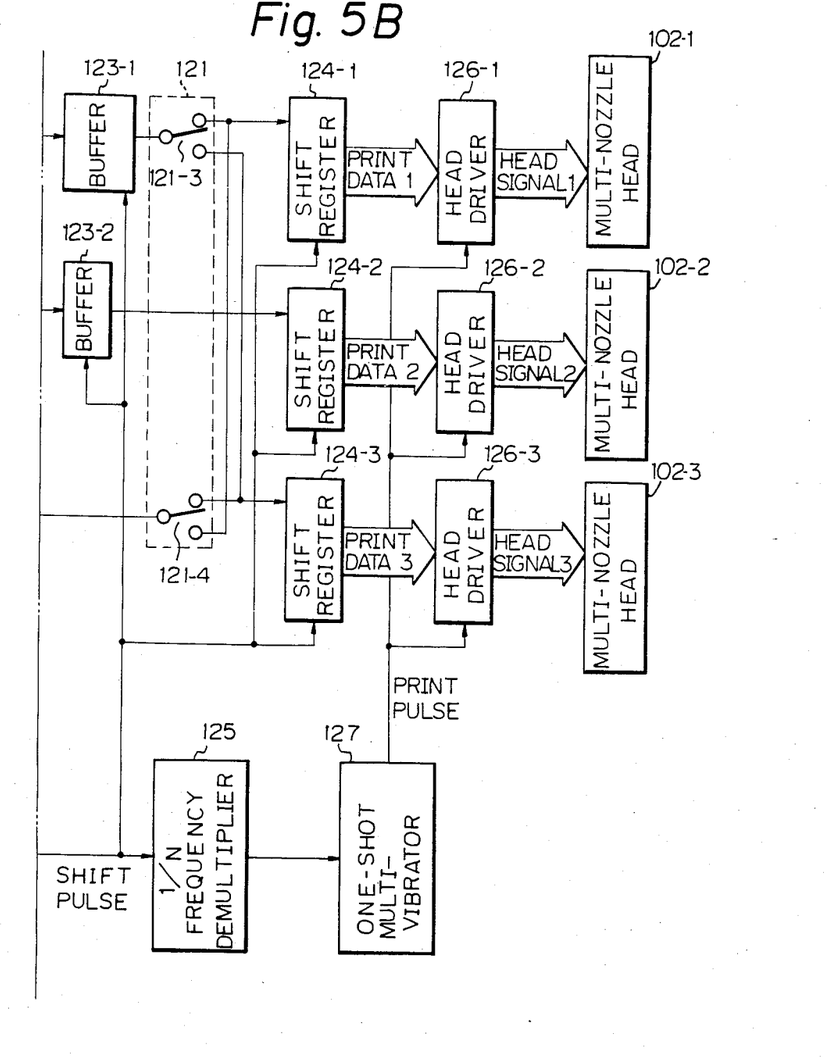

FIG. 5 shows a block diagram of the ink jet printer. Numeral 116 denotes a frame memory which stores a digitized image data inputted by an input device (not shown). The image data has a value proportional to a density of an original document. For example, it is an 8-bit digital value with 0 being assigned to a lightest area of the original document and 255 to a darkest area. An address controller 117 is connected to the frame memory 116. The frame memory 116 sends out the image data at the designated address in accordance with a pixel address signal sent from the address controller 117. The address controller 117 receives an X pulse indicating a position of the head in the main scan direction and a Y pulse indicating the position of the head in the sub-scan direction, supplied from a timing controller 122 and produces the pixel address signal which fits to an address format in outputting the image by the multi-nozzle heads 102-1 to 102-3. The X pulse and Y pulse signals from the timing controller 122 are also supplied to an X counter 119 and a Y counter 120, respectively. The X counter 119 and the Y counter 120 produce an X address signal and a Y address signal, respectively, which designate the position of dot in the dot matrix. They are stepped by the X pulse and the Y pulse, respectively. When the dot matrix is of 3×3, they are scale-of-three counters, and when the dot matrix is of 4×4, they are scale-of-four counters. Dot pattern memories 118-1 to 118-3 receive the image data from the frame memory 116, and the X address signal from the X counter 119 and the Y address signal from the Y counter 120 as memory addresses, and produce one-bit dot signals. The memory contents will be explained later. The dot signals A to C from the dot pattern memories 118-1 to 118-3 are supplied to shift registers 124-1 to 124-3, respectively, through a switching circuit 121 and buffers 123-1 and 123-2. The switching circuit 121 and the buffers 123-1 and 123-2 function to compensate for a positional shift in the main scan direction of the head of the ink jet printer of FIG. 4. The switching circuit 121 serves to match the print positions of the dots discharged from the respective heads in the forward and backward scans, and it simultaneously changes switches 121-1 to 121-4 at the switching between the forward print and the backward print. The buffers 123-1 and 123-2 may be shift registers which shift the dot signals sent from the dot pattern memories 181-1 to 181-3, one bit at a time, in synchronism with a shift pulse supplied from the timing controller 122. The capacity of the buffer 123-1 is N×2M bits where N is the number of nozzles of each of the heads 102-1 to 102-3 and M is the number of dots corresponding to the head-to-head spacing, that is, the spacing between the heads 102-1 and 102-2 in FIG. 1 and the spacing between the heads 102-2 and 102-3. A capacity of the buffer 123-2 is N×M bits. The dot signals, compensated for the bit print positions due to the head spacing, are supplied to shift registers 124-1 to 124-3, which shift N bits (the number of nozzles of each of the multi-nozzle heads 102-1 to 102-3) in synchronism with the shift pulse and output the stored signals as print data, N bits in parallel. The print data are supplied to head drivers 126-1 to 126-3, which send head signals to the multi-nozzle heads 102-1 to 102-3 in response to a print pulse signal supplied from a one-shot multivibrator 127. The print pulse is generated by the one-shot multivibrator 127 which is triggered by a signal generated by a 1/N frequency divider 125 which in turn frequency-divides the shift pulse by a factor of N. The pulse width of the print pulse is set to be sufficient to drive the multi-nozzle heads 102-1 to 102-3.

Figure 6:
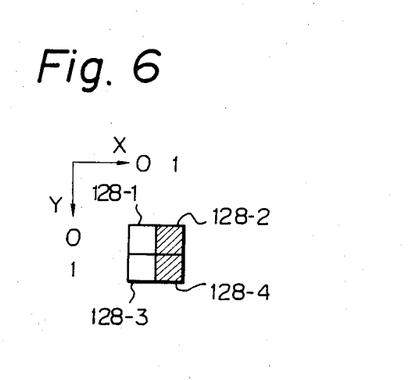
FIG. 6 shows a dot pattern and a relationship between an X address and a Y address.

FIG. 6 shows a relationship between the dot pattern written into the dot pattern memories 118-1 to 118-3 in the ink jet printer and the X and Y addresses. A 2×2 dot matrix is shown as an example. When the X direction and the Y direction are defined as shown in FIG. 6, a dot 128-1 has an X address=0 and a Y address=0 and a value 0, a dot 128-2 has an X address=1, a Y address=0 and a value 1, a dot 128-3 has an X address=0, a Y address=1 and a value 0, and a dot 128-4 has an X address=1, a Y address=1 and a value 1. The X and Y need not be identical to the X direction and Y direction in the head scan of FIG. 4.

Figure 7:
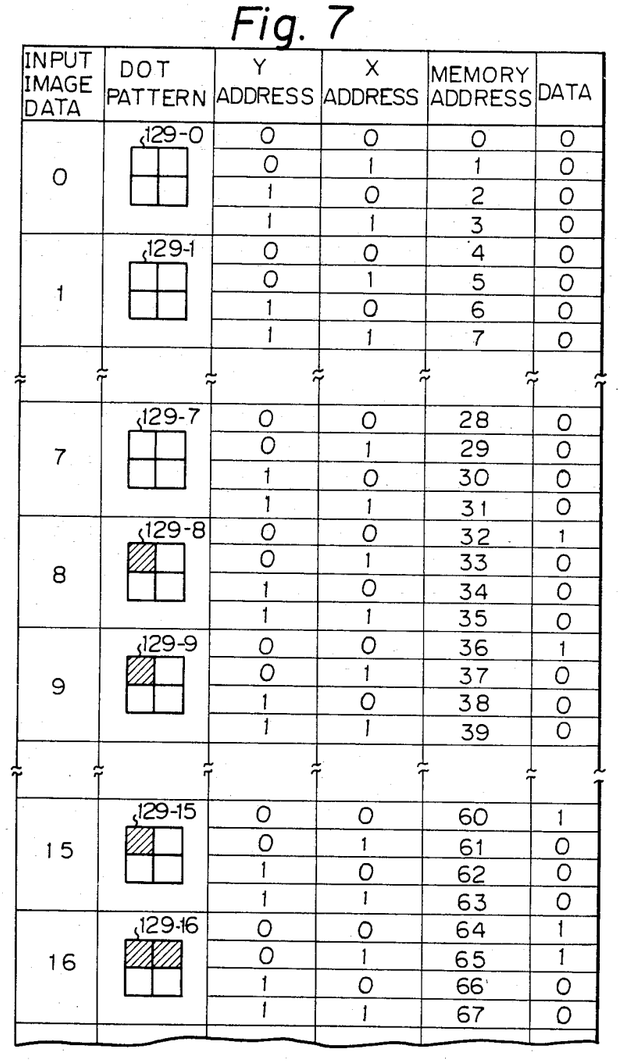
FIG. 7 shows a relationship between a dot pattern memory address and data.

FIG. 7 shows a relationship between the memory address and the data when the image data proportional to the density of the original document are related to the dot patterns. As an example, dot patterns 129-0 to 129-7 in which none of the dots is printed are related to image data 0 to 7, dot patterns 129-8 to 129-15 in which one of their dots is printed respectively are related to image data 8 to 15, and a dot pattern 129-16 in which two of its dots are printed is related to an image data 16. On the dot pattern memories 118-1 to 118-3, the image data, X address and Y address are used as the memory address. When the 2×2 dot pattern as shown in FIG. 7 is to be written into the dot pattern memories, four memory cells are assigned to one image data. A 1-bit data, which is "0" when no dot is to be printed and "1" when the dot is to be printed, is stored at the memory address. For example, for the image data 16, memory addresses 64–67 are assigned. The memory address 64 indicates X address=0 and Y address=0 and has a data "1", the memory address 65 indicates X address=1 and Y address=0 and has a data "1", the memory address 66 indicates X address=0 and Y address=1 and has a data "0", and the memory address 67 indicates X address=1 and Y address=1 and has a data "0".

Figure 8:
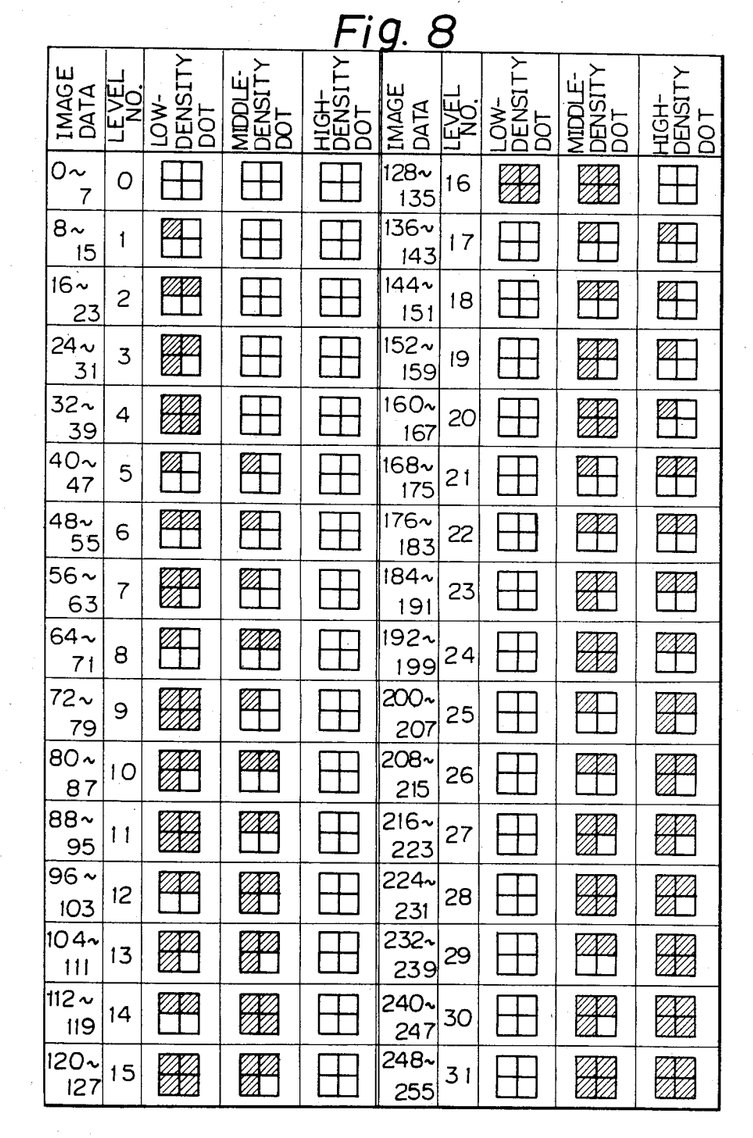
FIG. 8 shows a dot pattern in the second embodiment.

FIG. 8 shows a relationship between the image data and the dot pattern when an image is to be outputted by the ink jet printer in accordance with the present embodiment. In FIG. 8, a 2×2 dot matrix and high, medium and low concentration inks are used to reproduce 32 tones. Dot patterns for only low density dots, a combination of low density dots and middle density dots, and a combination of middle density dots and high density dots are produced and optical reflection densities (O.D. values) thereof are measured. The data are rearranged in the order of O.D. values. For a low density area, the low density dot pattern and the low-middle density dot pattern are selected, and for a high density area, the middle density dot pattern and the middle-high density dot pattern are selected. The dot patterns are related to the image data such that the image data which is a linear function of the O.D. value of the original document reads of the input device is rendered to have a linear relationship with the O.D. value of the print so that the tone of the original document and the tone of the print are matched.

In FIG. 8, a dot pattern is related to every eight image data, but after the tone correction described above, it may not be related in equi-space. The dot patterns thus defined are written into the dot pattern memories 118-1 to 118-3 so that the tone image is reproduced by the dot patterns shown in FIG. 8.

In the present embodiment, the digital modulation method which controls the number of dots in the dot matrix is used. Alternatively, an analog modulation method which controls a size of the dot or a digital-analog modulation method which is a combination of both may be used. While 2×2 dot matrix is used in the present embodiment, any dot matrix such as 3×3, 4×4, 2×3, 3×4 or n×m may be used.

The present invention can be expanded to a color printer. In the color printer, the effect of the present invention is significant because the quantity of inks is reduced. While the ink jet printer is used in the present embodiment, any printer which uses ink dots may be used.

In accordance with the second embodiment of the present invention, the number of ink dots overlapped at the same point for the same color is limited to up to two. Accordingly, since the number of ink dots printed at the same point is small, the smear of the ink and waviness of the record sheet are prevented.

When the medium concentration ink dots are to be used, the low density dots or high density dots are formed in the same dot matrix. Thus, a high tonality print which is free from the false outline is reproduced.

Thus, the present invention provides high tonality and high quality image.

The present invention is not limited to the illustrated embodiments but various applications and modifications can be made within the scope of the claims.

What I claim is:

1. A tone recording method for recording an image by forming dots in unit areas on a recording medium, the method comprising the steps of:
   providing at least two kinds of dots respectively having different concentrations for the same color; and
   controlling the optical density of each unit area of the image by selecting the number of dots of each concentration to be formed in each unit area and selectively overlapping dots of different concentrations in accordance with input density information.

2. A tone recording method according to claim 1, wherein each unit area includes n×m cells in which dots may be formed.

3. A tone recording method according to claim 2, wherein the dots are formed by recording with inks.

4. A tone recording method according to claim 3, wherein up to two ink dots may be overlapped in each cell.

5. A tone recording method for recording an image by forming dots on a recording medium, the method comprising the steps of:
   providing at least three kinds of dots respectively having different concentrations for the same color;
   forming the image by recording dots of different concentrations on the recording medium; and
   controlling the optical density of the image by selecting the kind of dot to be used and selectively overlapping dots of different concentrations in accordance with input density information, wherein the maximum number of dots of the same color that overlap is two.

6. A tone recording method according to claim 5, wherein an ink jet head is used to form the dots, and the dots of different concentrations are formed by different ink jet heads, respectively.

7. A tone recording method according to claim 5, further comprising a step of controlling the number of dots of each concentration to be formed in a unit area of the image in accordance with the input density information to provide each unit area with a predetermined optical density.

8. A tone recording method according to claim 7, wherein each unit area includes n×m cells in which dots may be formed.

9. A tone recording method according to claim 8, wherein no unit area of the image includes overlapping dots of the lowest and highest concentrations.

10. A tone recording method for recording an image by forming dots in unit areas on a recording medium, the method comprising the steps of:
    providing at least three kinds of dots respectively having different concentrations for the same color; and
    controlling the optical density of each unit area of the image by selecting the number of dots of each concentration to be formed in each unit area and selectively overlapping dots of different concentrations in accordance with input density information; wherein no unit area of the image includes overlapping dots of the lowest and highest concentrations.

11. A tone recording method according to claim 1 wherein each unit area includes n×m cells in which dots may be formed.

12. A tone recording method according to claim 1, wherein the dots are formed by recording with inks.

13. A tone recording method according to claim 12, wherein up to two ink dots may be overlapped in each cell.

* * * * *

UNITED STATES PATENT AND TRADEMARK OFFICE
CERTIFICATE OF CORRECTION

PATENT NO. : 4,686,538
DATED : August 11, 1987
INVENTOR(S) : YASUO KOUZATO

It is certified that error appears in the above-identified patent and that said Letters Patent is hereby corrected as shown below:

AT [56] UNDER REFERENCES CITED/U.S. PATENT DOCUMENTS

Line 12, "4,272,771  6/1981  Furukwa." should read
--4,272,771  6/1981  Furukawa.--.

COLUMN 1

Line 25, "the dots" should read --the dot--.
Line 26, "dot" should read --dots--.
Line 46, "junction" should read --juncture--.
Line 56, "the" should be deleted.

COLUMN 3

Line 61, "reproduceable" should read --reproducible--.
Line 67, "reproduceable" should read --reproducible--.
Line 68, "size" should read --sizes--.

COLUMN 4

Line 12, "much" should read --many--.
Line 13, "reproduceable" should read --reproducible--.
Line 21, "a" should read --the--.

COLUMN 6

Line 39, "reads of" should read --read by--.

UNITED STATES PATENT AND TRADEMARK OFFICE
CERTIFICATE OF CORRECTION

PATENT NO. : 4,686,538

DATED : August 11, 1987

INVENTOR(S) : YASUO KOUZATO

It is certified that error appears in the above-identified patent and that said Letters Patent is hereby corrected as shown below:

COLUMN 8

Line 32, "claim 1" should read --claim 10,--.
Line 35, "claim 1," should read --claim 11,--.

Signed and Sealed this

Fifth Day of January, 1988

Attest:

DONALD J. QUIGG

*Attesting Officer*  *Commissioner of Patents and Trademarks*